(12) United States Patent
Albrecht et al.

(10) Patent No.: US 9,129,330 B2
(45) Date of Patent: Sep. 8, 2015

(54) WIRELESS TRACKING AND INVENTORY MONITORING FOR WELDING-TYPE DEVICES

(71) Applicant: ILLINOIS TOOL WORKS INC., Glenview, IL (US)

(72) Inventors: Bruce Patrick Albrecht, Neenah, WI (US); Darryl Grant Harvey, Troy, OH (US); James F. Ulrich, Appleton, WI (US); Sundaram Nagarajan, Troy, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/231,165

(22) Filed: Mar. 31, 2014

(65) Prior Publication Data

US 2014/0214604 A1 Jul. 31, 2014

Related U.S. Application Data

(60) Division of application No. 11/470,717, filed on Sep. 7, 2006, now Pat. No. 8,686,318, which is a continuation-in-part of application No. 11/163,161, filed on Oct. 7, 2005.

(51) Int. Cl.
*B23K 9/10* (2006.01)
*G06Q 30/06* (2012.01)
(Continued)

(52) U.S. Cl.
CPC ............. *G06Q 30/0633* (2013.01); *B23K 9/10* (2013.01); *B23K 9/1062* (2013.01); *B23K 9/1087* (2013.01); *G01S 5/0018* (2013.01); *G06Q 10/087* (2013.01)

(58) Field of Classification Search
CPC ............. H04Q 5/22; H04Q 7/24; H04B 1/38; H04B 1/10; H04L 5/16; H04L 27/00; B23K 9/10
USPC ............... 219/137.7, 130.1, 130.01; 375/219, 375/220, 259, 349
See application file for complete search history.

(56) References Cited

U.S. PATENT DOCUMENTS 5,500,512 A 3/1996 Goldblatt
5,553,810 A 9/1996 Bobeczko
(Continued)

FOREIGN PATENT DOCUMENTS

DE 19654122 1/1998
DE 10058301 5/2002
(Continued)

OTHER PUBLICATIONS

Fuhr et al., Putting Sensors to Work 'Mesh Radio Network Performance in Cargo Containers,' Sensors, Mar. 2005, pp. 13-17 and 18, www.sensorsmaq.com.
(Continued)

*Primary Examiner* — Brian Jennison
(74) *Attorney, Agent, or Firm* — Fletcher Yoder P.C.

(57) ABSTRACT

A welding-type device has a wireless communication unit to transmit wireless signals comprising at least identification information or location information. The information may be transmitted either automatically or in response to request signals. Such a welding-type device may be configured to communicate with other welding-type devices, a monitoring device, or both. A wireless communication system has at least one welding-type device, at least one wireless communication assembly, and at least one monitoring device and is capable of assisting a user in locating particular welding-type devices, monitoring inventory, preventing theft of welding-type devices, and scheduling preventive maintenance.

16 Claims, 7 Drawing Sheets

(51) Int. Cl.
  *G01S 5/00* (2006.01)
  *G06Q 10/08* (2012.01)

(56) References Cited

U.S. PATENT DOCUMENTS

| | | | |
|---|---|---|---|
| 5,692,700 | A | 12/1997 | Bobeczko |
| 6,091,048 | A | 7/2000 | Lanouette |
| 6,248,975 | B1 | 6/2001 | Lanouette |
| 6,267,291 | B1 | 7/2001 | Blankenship |
| 6,459,989 | B1 | 10/2002 | Kirkpatrick |
| 6,510,984 | B2 | 1/2003 | Blankenship |
| 6,536,660 | B2 | 3/2003 | Blankenship |
| 6,552,303 | B1 | 4/2003 | Blankenship |
| 6,563,085 | B2 | 5/2003 | Lanouette |
| 6,708,877 | B2 | 3/2004 | Blankenship |
| 6,710,299 | B2 | 3/2004 | Blankenship |
| 6,728,619 | B2 | 4/2004 | Adachi |
| 6,852,949 | B2 | 2/2005 | Lanouette |
| 7,032,814 | B2 | 4/2006 | Blankenship |
| 2002/0119770 | A1 | 8/2002 | Twitchell |
| 2002/0168937 | A1 | 11/2002 | Clark |
| 2003/0094487 | A1 | 5/2003 | Blankenship |
| 2003/0160037 | A1 | 8/2003 | Hayes |
| 2003/0210140 | A1 | 11/2003 | Menard |
| 2004/0000498 | A1 | 1/2004 | Weissbrod |
| 2004/0026392 | A1* | 2/2004 | Feichtinger et al. ....... 219/130.5 |
| 2005/0110636 | A1 | 5/2005 | Ghaffari |
| 2005/0145688 | A1 | 7/2005 | Milenkovic |
| 2005/0275531 | A1 | 12/2005 | Johnson |
| 2006/0022867 | A1* | 2/2006 | Hessing .................... 342/357.03 |
| 2006/0038695 | A1* | 2/2006 | Isaacs .......................... 340/688 |
| 2006/0070987 | A1 | 4/2006 | Daniel |
| 2006/0071782 | A1 | 4/2006 | Ahmed |
| 2006/0173619 | A1 | 8/2006 | Brant |

FOREIGN PATENT DOCUMENTS

| | | |
|---|---|---|
| EP | 0852986 | 7/1998 |
| EP | 1229343 | 8/2002 |
| EP | 1681122 | 7/2006 |
| JP | 10305366 | 11/1998 |
| WO | 0207014 | 1/2002 |
| WO | 0247860 | 6/2002 |
| WO | 02085566 | 10/2002 |
| WO | 02086656 | 10/2002 |
| WO | 2007044135 | 4/2007 |

OTHER PUBLICATIONS

Fuhr et al., "The Realities of Dealing with Wireless Mesh Networks," 7 pages.

Ke et al., 'Discovery of Directional Communication Channels in Ad Hoc Networks,' 2 pages.

'Unidex's Lean, mean assembly machine', MRO Today, Jun./Jul. 2005, pp. 11-12, www.mrotoday.com.

'What is RFID?', http://www.rfidjournal.com/article/articleview/1339/1/129/, 5 pages.

Rogers, 'DME Basics', http://www.avweb.com/news/avionics/183230-1.html, 3 pages.

* cited by examiner

WIRELESS TRACKING AND INVENTORY MONITORING FOR WELDING-TYPE DEVICES

CROSS-REFERENCE TO RELATED APPLICATIONS

The present application is a divisional of U.S. Ser. No. 11/470,717, filed on Sep. 7, 2006, which is a continuation-in-part of U.S. Ser. No. 11/163,161, filed on Oct. 7, 2005, the disclosures of which are incorporated herein by reference.

BACKGROUND OF THE INVENTION

The present invention relates generally to welding-type devices, and more specifically, to an apparatus and system for wirelessly identifying, locating, and/or monitoring the status of remote welding-type devices located at a job site or in storage.

As is well known in the industry, welding-type equipment can be employed in a large variety of vastly differing work sites. For example, such equipment is used in environments like small or large workshops, factories, warehouses, distribution locations, construction sites, and expansive manufacturing yards such as ship building yards. The number of welding-type devices in use can range from one to several thousand, and can include any combination of welders, plasma cutters, induction heaters, and the like, all at one site. Furthermore, the materials, accessories, maintenance equipment, workpieces, and other equipment incident to welding-type processes can render a work environment cluttered and disorganized. Manufacturing yards and warehouses, in particular, are work sites in which thousands of welding machines, feeders, other welding-type equipment, consumables, and accessories are present and/or in use at one time.

Additionally, when welding-type equipment and consumables are not in use, they may often be stored in several different designated places, be left sitting at a particular work space, or simply be returned to the wrong storage location. Manufacturing yards typically have multiple buildings in which welding-type equipment is stored, used, lost, and stolen on a daily basis. Further, it may be that multiple welding-type devices appear substantially identical, especially containers of consumables. Therefore, it becomes difficult and time-consuming to locate desired welding-type equipment or the proper consumables at large work sites and storage facilities. The time spent looking for a particular device or consumable, determining which individual last used the device, etc., can detract from the efficiency of an overall construction or manufacturing project.

Furthermore, welding-type consumables are often time-sensitive. For example, some types of consumable welding wire should ideally not be left sitting for excessive periods of time before use. Corrosion, warp, and other well-known conditions may develop if welding wire containers are lost, forgotten, or otherwise not properly tracked. Similar disadvantages may occur when other welding-type devices and consumables are idle for prolonged periods of time.

Also, in situations where numerous welding-type devices are used, these devices may end up scattered across vast worksites, and thus become difficult to track or locate. The occurrence of theft thus increases. This can be particularly problematic for inverter-based welders and other lighter systems, as well as for consumable containers. Also, as a result of the vast size of ship building yards and other similar manufacturing sites, welding-type equipment may frequently be taken from the work site through various gates, unknown to and unauthorized by an owner. As such, when a work environment is disorganized and equipment and consumables are difficult to locate, an item could be missing for several days before an owner becomes aware that the item was stolen rather than merely misplaced or lost.

Welding-type devices also require periodic scheduled and unscheduled maintenance. Thus, maintenance personnel must be notified of new maintenance issues, the nature of the issues, the location of the device, and any helpful operating or maintenance history information to properly address the issues. In addition, maintenance records must be kept for each device, and maintenance personnel must be notified or otherwise keep track of when a scheduled maintenance task becomes due. Such scheduled maintenance tasks may include cleaning of various components, oiling of the device, replacement of regularly worn parts, or manually uploading system software upgrades or patches. Sometimes the same repair is needed on multiple machines and the time it takes to find the machines can actually exceed the time to do the repair or upgrade. If a maintenance crew cannot locate a device in a timely manner, a scheduled or unscheduled maintenance issue may go unresolved and lead to damage to the device.

Other drawbacks of existing welding-type device inventory systems arise from the procedures by which device-specific information is kept. For example, records of the operations in which a device has been used, which operation a welding-type device is currently assigned to, which individuals have used a device, which individual is currently using a device, and when a device will next be available are often kept in a log book or database by a facilities or tools department. Details of the maintenance tasks that have been performed on a device and schedules of when preventive maintenance should be performed may be kept in logs or databases by the facilities or tools department, or by a maintenance department. Further, it is not uncommon for operator notes, technician notes, and known issues with equipment to be maintained by a variety of persons or departments within a firm. Typically, an operator's manual is minimally used to record past and future maintenance as well as operator notes, etc.

Manuals, log books, and other media are also not always easily locatable. These types of records could be kept at a number of locations, including with the device itself. Understandably, this does not aid in alerting owners or maintenance personnel of upcoming maintenance tasks. Additionally, a maintenance worker on a job site may not always remember to log information into a book or database when he or she returns to the department, or may find the recording of such information unnecessary. Furthermore, when these types of records are needed on site, they are not always easily located or available.

It would therefore be desirable to have a system for easily locating and keeping inventory of welding-type devices, accessories, and consumables in storage or in use at a job site or storage facility. Furthermore, it would also be desirable if such system was also capable of providing information and notifications regarding past use and maintenance, current usage, scheduled preventive maintenance, dates of purchase or receipt, and/or operator notes. It would also be desirable to monitor locations, real-time operations, interoperability, and/or current inventory of a device, machine, consumable material, or accessory remotely.

BRIEF DESCRIPTION OF THE INVENTION

The present invention provides an apparatus and system for wirelessly locating, keeping inventory of, and communicating with welding-type devices that overcome the aforementioned drawbacks. A wireless communication unit capable of transmitting device information such as location and status is connected to a welding-type device to communicate such information to a monitoring unit or other welding-type devices. In this regard, real-time status of a welding-type device can be ascertained remotely.

Therefore, according to one aspect of the present invention, a welding-type consumable inventory system is disclosed, including at least one wireless monitoring device and at least one welding-type consumable container. The container has a consumable amount sensor and a wireless transmitter that is configured to emit wireless data signals which indicate both the type and amount of welding-type consumable in the container. Further, the at least one wireless monitoring device is arranged to find the at least one welding-type consumable container by receiving the wireless signals thereof.

In accordance with another aspect of the invention, a method is disclosed for implementing a consumable inventory system. The method includes configuring welding-type consumable containers to emit locatable data signals, arranging a wireless detection network in a facility such that it can receive the signals, associating a computer readable storage medium with a processing unit of the wireless detection network, and storing a computer program on the storage medium. The computer program, when executed, causes the processing unit to determine the remaining amount of welding-type consumables within the facility and automatically generate a re-supply order when the amount remaining reaches a threshold level.

According to a further aspect of the present invention, a welding-type consumable inventory unit is disclosed. The inventory unit includes a shipment unit having welding-type consumable containers stored therewith. Each consumable container has a low power transmitter, and the shipment unit has a transceiver that is positioned to receive signals of the low power transmitters and emit a signal of relatively higher transmission strength which represents consumable type data determined from the consumable containers' signals.

In accordance with yet another aspect of the present invention, a consumable monitoring network is also disclosed. The network includes one or more wireless transceivers and a memory unit. The wireless transceivers each have a processing unit attached thereto, and are designed to receive and process signals from welding-type devices within a facility. The signals emitted by the welding-type devices include encoded data indicating locations and characteristics of the welding-type devices. A comparison performed between the location and characteristic data of the welding-type devices and compatibility data stored on the memory unit determines whether the transceiver generates an incompatibility signal.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the Drawings.

DETAILED DESCRIPTION OF THE PREFERRED EMBODIMENT

As one skilled in the art will fully appreciate, the hereinafter description of welders, welding accessories, welding devices, and welding systems also applies to the constituents of any system that requires high power outputs, such as heating and cutting systems. That is, the present invention is equivalently applicable with any device requiring high power output, including welders, plasma cutters, induction heaters, aircraft ground power units, and the like, as well as accessories and components thereof. Reference to welding power, welding-type power, or welders generally, includes welding, cutting, heating power, or ground power for aircraft. Description of a welding apparatus illustrates just one embodiment in which the present invention may be implemented.

Figure 1:
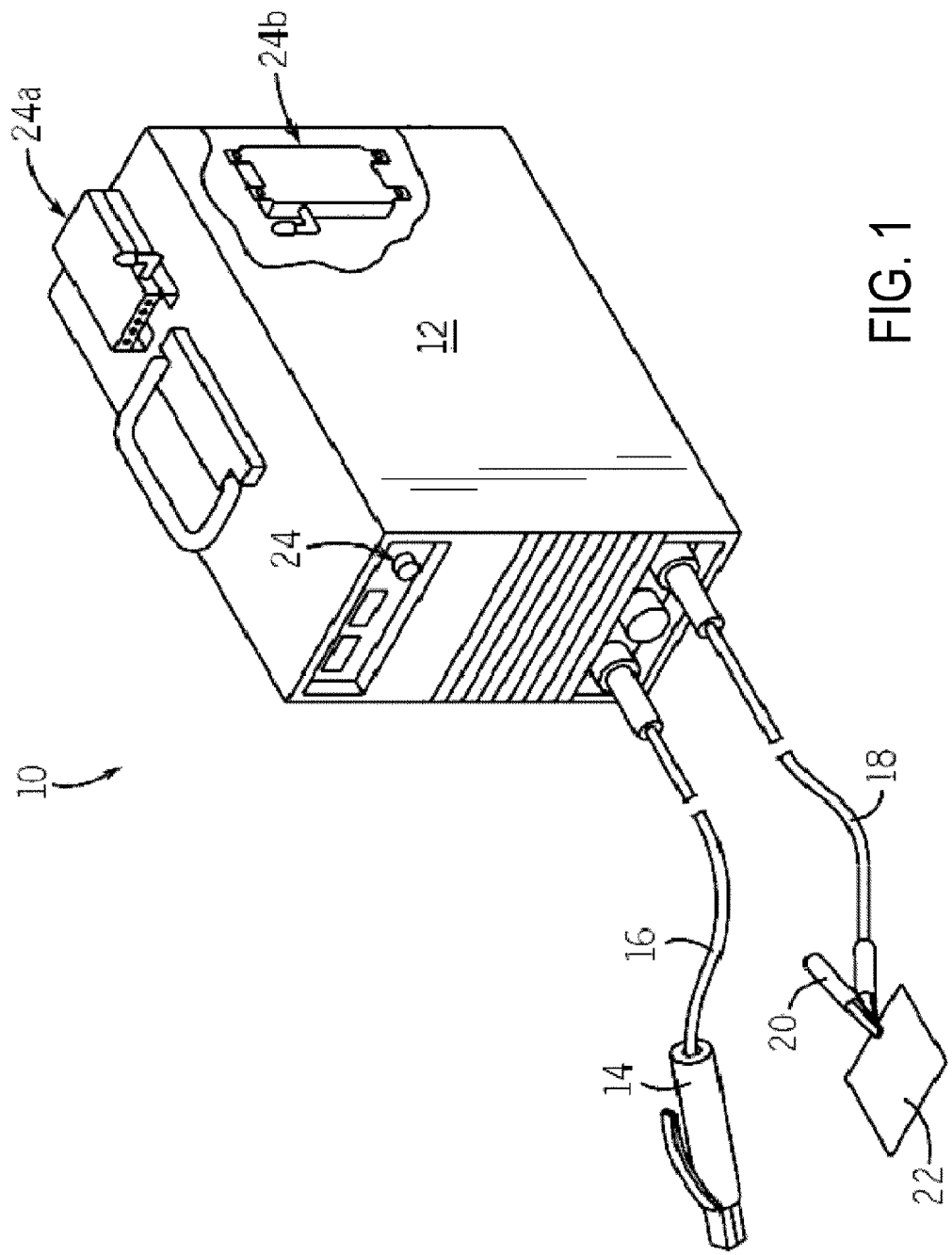
FIG. 1 is a perspective view of a welding-type apparatus in accordance with the present invention.

Referring to FIG. 1, a welding apparatus 10, in accordance with the present invention, is shown. As depicted, welding apparatus 10 includes a welding-type device such as a power source 12, although the present invention is not limited to welding-type power sources. Power source 12 is preferably constructed to receive an input power and generate an output suitable for welding. A torch 14 is operably connected to power source 12 via weld cable 16. Ground cable 18 attaches clamping member 20 to power source 12. Clamping member 20 is constructed to removably secure cable 18 to workpiece 22 so that a desired welding application may be performed. Wireless communication assembly 24 can be seen in break away view, 24b, attached inside power source 12 or optionally attached atop, 24a, an outer surface of power source 12. The desired position of wireless communication assembly 24 will depend upon the type of welding-type apparatus 10, the desired mode of wireless communication, and other design considerations. For example, wireless communication assembly 24 may operate as a radio frequency (RF) communication device, in which case it might be beneficial to dispose wireless communication assembly 24a outside power source 12 for increased range and better reception. Alternatively, in a preferred embodiment, wireless communication assembly 24b is disposed inside the housing of power source 12 for increased durability.

For example, wireless communication assembly 24 could operate as a common infrared communication device. In such a case, wireless communication assembly 24 could be disposed inside or outside a welding-type device so long as the infrared port (not shown) is capable of communication. Wireless communication assembly 24 could also operate as a sub-sonic or ultra-sonic device, in which case wireless communication assembly 24 could be disposed inside or outside a welding-type device. Likewise, if wireless communication assembly 24 were to operate as an optical or laser-type communication device, it could be disposed inside or outside a welding-type device so long as the optical communication port was exposed. From the hereinafter description of wireless communication assembly 24, it will be readily appreciated that a number of different modes of wireless communication may be suitable for use with the present invention.

In addition, it will be understood that the present invention is applicable to a multitude of welding-type devices, accessories, consumables, and the various containers thereof. Not only is the present invention particularly useful in providing for wireless communication with a welding-type power source, the present invention also finds utility when extended to include other components of welding-type systems. Wire feeders, generators, weld guns and torches, advanced and user-adapted systems, accessories, consumables, containers, and the like are all capable of being incorporated with the present invention. The phrase "welding-type device" shall include all devices useable in a welding system, including but not limited to welders, power sources, wire feeders, generators, weld guns and torches, advanced and user adapted systems, shielding gas tanks and containers, wire reels, spools, drums, bulk packs, crates, pails, buckets, and pallets, electrode packages and vacuum packs, flux cans, cartons, and tubes, individual and bulk units of other consumables, other device accessories, and the like.

Figure 2A:
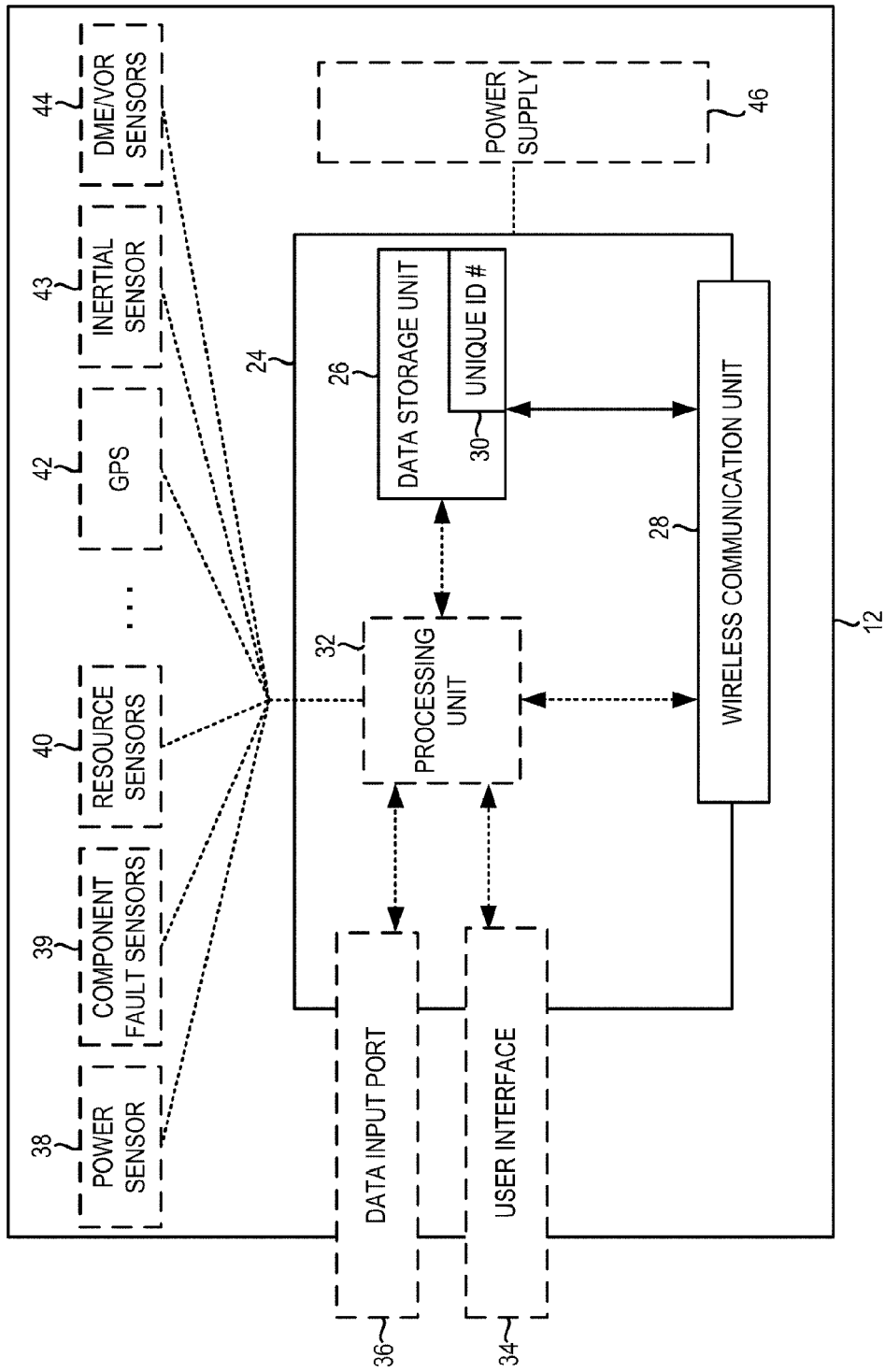
FIG. 2A is a schematic view of one embodiment of a wireless communication unit in accordance with the present invention.

Referring now to FIG. 2A, a schematic view of wireless communication assembly 24 is shown. Wireless communication assembly 24 includes a data storage unit 26 and a transmitter or wireless communication unit 28. Wireless communication unit 28 and data storage unit 26 are connected for bi-directional data transfer, as shown. However, in certain embodiments, wireless communication unit 28 and data storage unit 26 may be only uni-directionally connected. Data storage unit 26 is conceptually shown as having at least a unique identification number 30 stored thereon. Processing unit 32, user interface 34, data input port 36, power sensor 38, component fault sensors 39, resource sensors 40, GPS device 42, inertial sensor 43, DME/VOR sensors 44, and power supply 46, shown in dashed lines, are optionally integrated into various embodiments.

Data storage unit 26 may be more than a simple memory device, and can include a configuration of electrical components which alter a received signal in a predetermined way. In such an embodiment, the original signal is modified by data storage unit 26, then reflected back to its source through wireless communication unit 28, in accordance with "passive" wireless communication. For example, a signal received by an RF antenna might be used to power the circuitry of data storage unit 26 to alter the load on the RF antenna, which could then be detected by the originator of the signal. In other words, data storage unit 26 and wireless communication unit 28 could be configured as a passive RFID tag. A "passive" RFID tag is one that does not require an internal power source. Alternatively, the tag may be an active RFID device, having its own power source. While both active RFID and passive RFID use radio frequency energy to communicate between a tag and a reader, the way each tag is powered is different. Active RFID uses an internal power source (usually a battery) within the tag to continuously power the tag and its RF communication circuitry, whereas passive RFID relies on RF energy transferred from the reader to the tag to power the tag.

Alternatively, data storage unit 26 may be a more complex component, capable of storing and deleting digital data. Such a unit may include an integrated processor or microcontroller. In a preferred embodiment, data storage unit 26 is a digital storage device capable of having several types of information stored thereon, such as information specific to a welding apparatus, accessory, or consumable, and various message or transmission protocol formats. That is, data storage unit 26 may be connected to several sources of data input and store various types of information acquired therefrom. A data storage unit 26 may also be configured for rapid memory access, as when supplying a "real-time" data transfer. However, at a minimum, data storage unit 26 should be capable of providing identification information to wireless communication unit 28 for transmittal, such as a serial number, a unique identification code, system type information, device type, consumable type or consumable characteristics, a lot number, or a network ID number. As mentioned above, it is contemplated that such identification information may be transmitted in various forms, such as a reflected signal alteration or a digital data-encapsulated wireless message.

Wireless communication unit 28 may include a transmitter, transponder, transceiver, or the like, depending upon the desired level of communication protocol complexity. That is, wireless communication unit 28 may be merely a transmitter capable of actively emitting signals, such as a beacon signal, but not necessarily configured to receive or recognize external signals. Or, wireless communication unit 28 may be a transponder emitting signals in a passive or active style, but only in response to received external signals. As described previously, wireless communication unit 28 may emit modified signal reflections as a response, but may also emit response signals generated entirely by wireless communication assembly 24. In addition, wireless communication unit 28 may comprise a transceiver capable of both responding to received signals and transmitting independently originated signals. Also as mentioned above, it is contemplated that wireless communication unit 28 may operate by transmitting and receiving RF signals of various frequencies and protocols, infrared signals, optical signals, ultrasonic or subsonic signals. Such various RF frequencies and protocols can include RFID and derivatives, or the distinctive RuBee technology available from Visible Assets, Inc., One, Datran Center, 9100 South Dadeland Blvd., Suite 106, Miami, Fla. 33156-7189.

It is also desirable to include a micro-controller, or processing unit 32 in wireless communication assembly 24. For example, a processing unit 32 may decode and identify received messages if a complex communication protocol is used. Further, if an appropriate response message is to be sent, based on some condition of the welding-type device for example, a processing unit 32 may request appropriate data from data storage unit 26, generate a data packet, and relay the message to wireless communication unit 28. Alternatively, processing unit 32 may generate data packets for response messages containing information received directly from sensors 38-44, such as remaining resources of the device. Therefore, if a processing unit 32 is to be included in wireless communication assembly 24, then wireless communication unit 28 and data storage unit 26 may both be bi-directionally connected to processing unit 32. It is recognized, however, that a processing unit 32 may be unnecessary for a given wireless communication protocol.

Wireless communication assembly 24 may also include several types of sensors and interfaces configured for data input and output. These devices include a user interface 34, a data input port 36, a power sensor 38, various component fault sensors 39, various resource sensors 40, a GPS device 42, inertial sensors 43, and DME/VOR sensors 44, among others. User interface 34 may comprise an LCD display or LEDs for relaying messages to users, as well as a user input device such as command buttons or a numeric or alphanumeric keypad. Therefore, user interface 34 is shown as bi-directionally connected to processing unit 32. In this manner, when a user begins using a welding-type device, the user may be prompted to enter a user code so that current user information may be stored on data storage unit 26. Similarly, a user could enter operator notes or comments directly into user interface 34 to be stored on data storage unit 26. User interface 34 may also allow a user to view the data stored on data storage unit 26. For example, user interface 34 could display the remaining amount of power in a system battery or the remaining amount of welding consumable of the device. However, it is also contemplated that user interface 34 may be a simple display panel that merely receives instructions from processing unit 32, but does not communicate bi-directionally.

The series of sensors and inputs 36-44 also are not required to be bi-directionally connected to processing unit 32. For example, it is envisioned that data input port 36 need not function as a bi-directional port, although a bi-directional port is contemplated. Data input port 36 may be used only to log information onto data storage unit 26 via processing unit 32, or data input port 36 may be used for full bi-directional communication with an external device such as a monitor device or a computer. In an alternative embodiment, data input port 36 and processing unit 32 may also be integrated with a welding-type device controller to update such stored functions as pulse sequences, user message displays and commands, and control limitations. That is, data input port 36 may operate as an updating module to receive system software upgrades or updates to be stored on data storage unit 26. The upgrades or updates could be used to update the system software of wireless communication assembly 24, a welding-type device controller, or both. Thus, a number of port types and protocols may be used to accomplish the aforementioned data storing or updating, such as serial ports, parallel ports, USB ports, wireless USB adapters, infrared ports, and the like. Of course, one of ordinary skill in the art will appreciate that the same updating function may be equivalently performed via wireless communication unit 28.

Additionally, wireless communication assembly 24 may also be connected to operation status sensors 38-40. A power sensor 38 may be employed to notify processing unit 32 whether a welding-type device is "on" or "off", whether a torch or gun is operating or not, current battery level(s), and other operational conditions derived from sensed power levels. In addition, wireless communication assembly 24 may be connected to component fault sensors 39. A number of sensors 39 may be employed, each sensor 39 being individually configured to detect an operational error in a particular component of a welding-type device. Processing unit 32 could record summaries of the time or operating conditions under which errors occur onto data storage unit 26, and/or prepare real-time component error messages as soon as errors occur. Furthermore, other sensors 40 are used to detect current device resources, such as the amount of consumable wire remaining, the amount of remaining shielding gas, which accessories are attached to the device, and whether the accessories are compatible with the device's system type. Processing unit 32 could then calculate whether or when additional resources will be required based on recent usage data stored on data storage unit 26, or based upon predetermined minimum levels. Accordingly, summaries of operation status, continuous real-time operation status information, or automatic notifications of current or imminent errors and requirements may be transmitted via wireless communication unit 28.

In addition, wireless communication assembly 24 may also be connected to several types of location or tracking sensors 42-44. For example, in one embodiment, wireless communication assembly 24 may be connected to a GPS device 42. That is, a GPS device 42 may be integrated with wireless communication assembly 24 or its corresponding welding-type device to provide an absolute location reading. Such location information could then be forwarded to other welding-type devices, transmitted directly to a monitor device, or could be used to display position on user interface 34 of wireless communication assembly 24. It is further contemplated that an inertial sensor 43, preferably a MEMS-type sensor, may also be incorporated for relative tracking or position information, or to supplement other location sensors such as the GPS device 42. Also, sensors 44 operating in a similar fashion to DME (Distance Measuring Equipment) and VOR (Very high frequency Omni Ranging) sensors may be employed to determine position information of a welding-type device relative to a monitoring device or radio tower. DME/VOR sensors 44 (such as radio antennas) determine how far an object is from a DME transmitter (not shown) and at what angle an object is from a VOR transmitter (not shown). Thus, the polar coordinates of a welding-type device could be determined relative to a monitoring device 48 or other device transmitting DME/VOR signals. In a similar fashion, a LORAN-type system (LOng RAnge Navigation) could be employed in some work sites to determine the position of a given welding-type device. As known in the art, a LORAN system uses the time difference between receipt of a signal at two different stations to calculate a general position of a transmitter relative to the stations. Accordingly, monitoring devices 48 may incorporate signal-receipt time differentiation equipment to measure the time at which a signal is received from a welding-type device by various monitoring devices to determine the welding-type device's location. In such an embodiment, wireless communication unit 28 is configured to emit a measurable LORAN-type signal. It is understood, however, that DME/VOR, GPS, and LORAN-type sensors and signals represent just some examples of location identifying techniques, and that other frequencies, topologies, and protocols are equivalently contemplated.

In some embodiments, wireless communication assembly 24 may also include an integrated power supply 46 to provide an operating voltage to the components of the wireless communication assembly 24. Power supply 46 may include a battery or other storage device suitable for providing an operating voltage. Alternatively, it may be more efficient or convenient to provide a connection for the wireless communication assembly 24 to receive power from a power source 12 or other device of a welding apparatus 10. Some welding-type devices may have their own internal power supplies, such as batteries or engines, while other devices may rely upon connection to a utility power or generator. In either case, power supply 46 could include a power conditioner to condition the welding-type power input into an appropriate operating input for wireless communication assembly 24. Also, power supply 46 could include a battery that is trickle-charged by a power source 12 or other welding-type device, when the power source or other welding-type device is on or in use. In addition to hardware concerns, various battery management techniques may be employed to conserve power. For example, wireless communication assembly 24 could operate in a low-power or "sleep" mode until receipt of a request signal, relay signal, or other signal which would necessitate a response or action of wireless communication assembly 24. Alternatively, wireless communication assembly 24 could be configured to only transmit or receive signals on an intermittent period, as opposed to receiving or transmitting signals at any time which could drain power.

Figure 8:
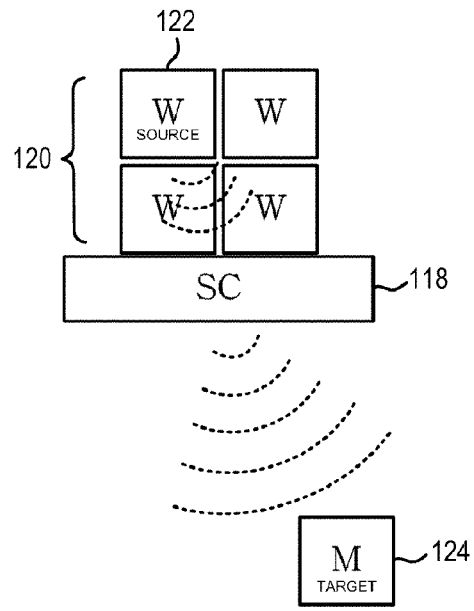
FIG. 8 is a schematic view of welding-type devices and a monitoring device in accordance with another aspect of the present invention.

A bracket 25 or other securing member is also contemplated for mounting or integrating the wireless communication assembly 24 with a particular welding-type device. As shown in FIG. 1, if wireless communication assembly 24b is to be integrated inside the housing of a power source 12, a series of tabs 25b or lips may be used to secure wireless communication assembly 24 to a surface inside a welding-type device. Alternatively, if wireless communication assembly 24a is to be mounted outside the housing of a welding-type device, a bracket 25a, also shown in FIG. 1, may be used. A bracket 25 which spaces wireless communication assembly 24 apart from a welding-type device may help improve signal quality, depending upon which mode of communication is adopted. For application of the present invention to welding-type consumable inventory in particular, wireless communication assemblies 24 may be attached directly to the reels, spools, crates, pallets, skids, drums, barrels, tanks, and other containers housing the consumable materials. It is also recognized that combinations of active wireless communication assemblies 24 such as shown in FIG. 1 may be affixed to or integrated with a pallet or other shipping or storage container to receive short range transmissions of passive or low-power communication assemblies affixed to each package or individual unit of welding-type consumable thereof. An example of such an alternative is shown in FIG. 8 and described below. In addition, wireless communication assembly 24 may take the form of a kit to retrofit existing welding-type devices, in which case, a bracket 25 or housing configured to secure and mount a wireless communication assembly 24 to a welding-type device is provided. Finally, if desired, it is contemplated that the bracket 25 or housing which mounts wireless communication assembly 24 may comprise a material which is useful in shielding wireless communication assembly 24 from stray signals or other interference which may emanate from a welding-type device.

In operation, wireless communication assembly 24 may be configured to communicate with other welding-type devices, monitoring devices, or both. The wireless communication assembly 24 of a first welding-type device may communicate signals directly to the wireless communication assembly 24 of a second welding-type device. Also, a monitoring device 48 may be provided which receives and transmits signals in direct communication with wireless communication assemblies 24 of one or more welding-type devices. In a preferred embodiment, both of these functions are incorporated in a mesh network architecture including device-device transmissions and device-monitor transmissions. In other words, a preferred embodiment of the present invention incorporates a mesh network topology and protocol.

Mesh networks are characterized by their lack of a center hub to which all nodes would normally be directly connected. Thus, to facilitate node-to-node communication, algorithms are used to determine the best data transmission path from an originator node to a recipient node. However, it is also contemplated that a "blind" message relay system may be employed. In the first instance, nodes periodically communicate with one another to determine which nodes are within transmission range of other nodes. In the later case, a node receiving a message intended for another node re-transmits the message to any other nodes in range rather than determining the most efficient data transmission route. This type of communication procedure may be more useful in smaller networks or in networks in which the paths from node to node are simple, known, or predetermined.

In a preferred embodiment, each mesh network data transmission of the present invention contains a source ID and a destination ID. The destination ID informs nodes that receive the transmission of its intended recipient. If the receiving node is the recipient, the message is decoded and processed. If the receiving node is not the intended recipient, the message is relayed to other nodes. The source ID is used to direct response messages, when a response message is required.

As discussed previously, a wireless communication assembly 24 may be powered primarily by the welding-type device to which it is connected, when the device is in operation, and a battery or other integrated power supply 46 when the device is off. Therefore, to locate, detect, or communicate with a welding-type device that is not in operation would require the wireless communication assembly 24 of such welding-type device to transmit signals from battery power alone. One of ordinary skill in the art will recognize that transmission range of wireless signals is often directly related to power consumption. As such, transmitting a signal from a welding-type device directly to a distant monitoring device 48 will consume more power than transmitting the signal to another welding-type device which is closer. Therefore, by employing a mesh network, the need to transmit wireless signals over potentially longer distances is eliminated and power consumption is reduced.

Additionally, the use of a mesh network allows for wireless communication assemblies to be disposed inside welding-type devices without increasing required power consumption. A metal outer housing of a welding-type device can create a high signal attenuation, which must be overcome by using higher power signals or forming gaps in the housing. However, when using shorter transmission distances, such as in a mesh network topology, the higher attenuation rate of a device housing becomes a less significant factor, and power consumption can remain relatively lower. While a mesh network topology has recognizable benefits, one of ordinary skill in the art will also understand that other network topologies are equivalently applicable, such as a traditional "star-shaped" network topology, or distributed or "tree" network topologies. Also, the use of repeater units and/or signal boosters can aid in overcoming transmission hindrances in any network topology, especially when welding-type devices are located in areas which create a high degree of signal attenuation, such as in the hulls of ships. For example, welding-type consumable packages or tanks stored on a shipping container may use low power, short range transmitters to send messages to a higher power, longer range transmitter attached to the shipping container. In a preferred embodiment, an active RFID unit is attached to a pallet and passive RFID units are attached to wire reel packages stored or shipped on the pallet. Thus, the transmitter of a shipping container may be incorporated as a node in a mesh network, or may simply operate to boost or repeat signals of the nodes in a traditional network configuration. As such, wireless networks of the present invention may be of any traditional topology, a hybrid or partial mesh topology, or a full mesh topology.

The signals or messages emitted by the wireless communication assembly 24 may contain several types of location or identification information. These signals or messages may be transmitted autonomously, or in response to location or identification request signals. Regardless of the desired response signal format, each transmission of wireless communication assembly 24 can at least relate identification information specific to the corresponding welding-type device. Identification information can include a device-specific code or identifier such as a serial number or a user-defined identification number. More complex forms of transmittable identification information include ownership information, serial numbers, current users, system type, device type, accessory types, consumable type and characteristics, and network IDs. In addition, any signal that a wireless communication assembly 24 emits containing a device specific identifier may be used to locate the wireless communication assembly 24 and its corresponding welding-type device. That is, directional antennas, triangulation, and simple honing techniques could be employed by the user of a monitoring device 48 to find a transmitting welding-type device, even though no particular location data is encoded in the signal. However, a location signal could also include more particularized location information, such as GPS data, relative DME/VOR position information, LORAN signals, inertial location information, and the like.

In addition to merely locating a particular device, identification information may also be useful when preparing to perform a welding-type process. When a user desires to find components which are needed to operate a welding-type apparatus, the user could use a monitoring device 48 to send a system-type identification request. Based upon the system-type, device type, accessory type, consumable type, or characteristic information stored on data storage unit 26, wireless communication assembly 24 may respond with a location and/or identification signal upon receiving such a request so that a user can easily locate only the type of devices which are desired. For example, if a user wished to prepare for a plasma cutting process, the user could send a plasma cutting system identification request via monitoring device 48. All plasma cutting power supplies, torches, accessories, and other such equipment related to the requested plasma cutting process in the vicinity would then respond with a location and/or identification signal. Monitoring device 48 would then direct the user as to which types of plasma cutting equipment are nearby, and where each of those devices is generally or specifically located. One of ordinary skill in the art will recognize that variations of the system type identification request signal are possible, and that any desired level of specificity may be used in the locating criteria.

Similarly, the system, device, accessory, or consumable type information may be used in conjunction with a compatible device register or database stored on a memory device of a monitoring network to monitor ongoing welding processes in a manufacturing or other industrial facility, as will be further explained below. A network of one or more monitoring devices may be arranged about a facility to monitor the location and type of power sources, accessories, consumable containers, and other welding-type devices. If, for example, a consumable container of a particular type is transported to a zone of the facility in which a non-compatible welding process is being carried out, the network can either disable the power sources in the zone or instruct the consumable container to indicate a warning to a user, in order to prevent problems from incompatible usage.

Wireless communication assembly 24 may also transmit device-specific operation information received from sensors 38-40 and/or logged onto the data storage unit 26 by a data input device 28, 34, 36. The operation information may be transmitted autonomously, or in response to operation or status request signals. Operation information received from sensors 38-40 includes information such as whether the device is on or off, whether it is currently being used, current device resources, existing and imminent operational problems, and real-time operational status information. Current device resource information will vary by device type, but can include such data as remaining charge of a power source battery, remaining shield gas pressure of a tank, remaining consumable wire on a reel or spool, and the like. Operation information logged onto data storage unit 26 from external sources may include current software versions, a history of usage, a history of maintenance that has been performed in the past, a schedule of preventive maintenance to be performed in the future, an employee ID of the current user, the current project, job site, or operation to which the device is assigned, or operator comments and notes. Such information may be logged onto data storage unit 26 via wireless communication unit 28, user interface 34, or data input port 36. As mentioned above, operation information may be transmitted in a summary form or in a real-time format, and may be transmitted independently or upon request.

Figure 2B:
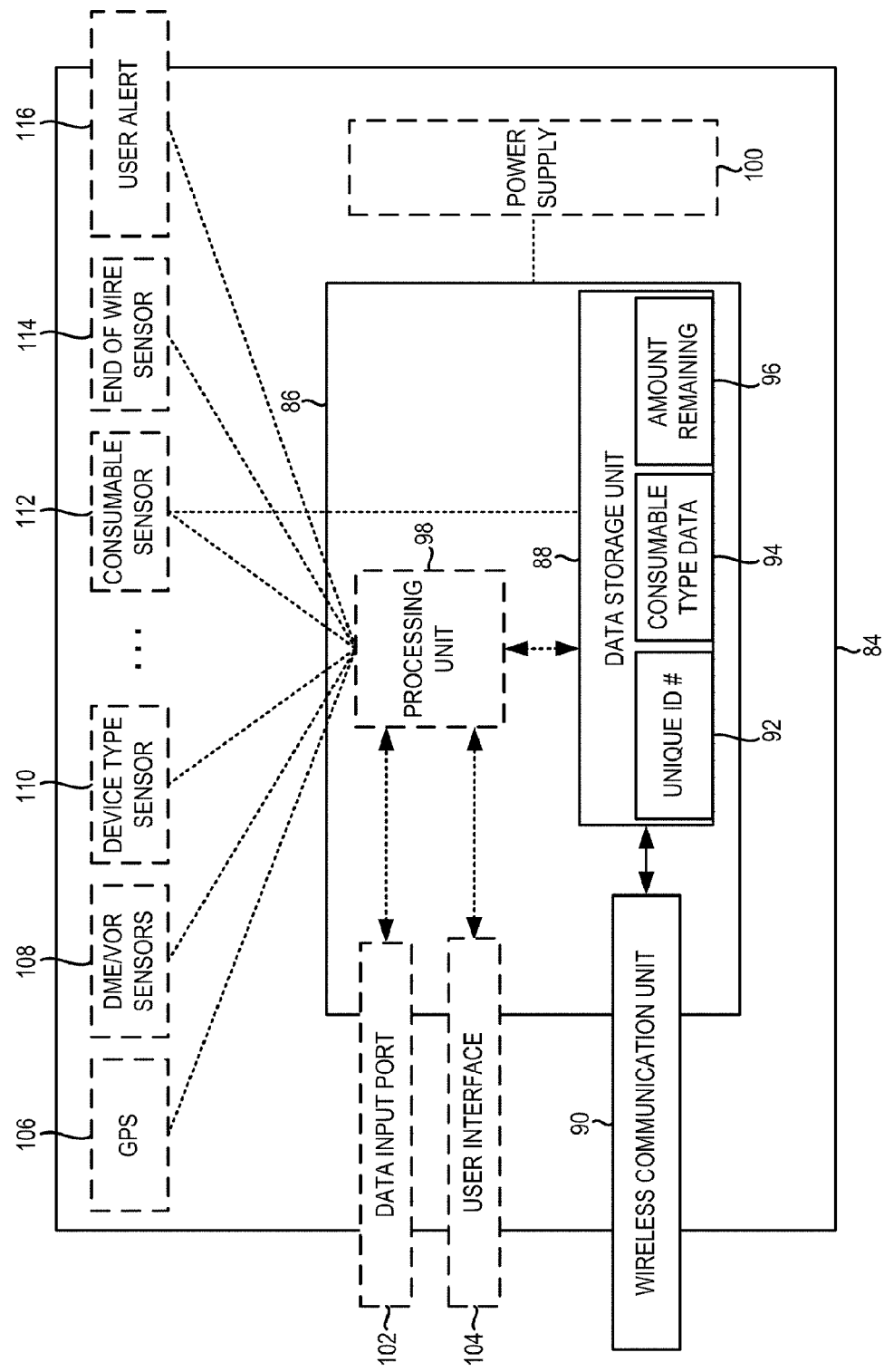
FIG. 2B is a schematic view of another embodiment of a wireless communication unit in accordance with the present invention.

FIG. 2B shows another embodiment of a wireless communication assembly 86 of the present invention, particularly constructed for use with a consumable container 84. For purpose of illustration, consumable container 84 will be described as a weld wire reel. However, it is understood that the features of the embodiment of FIG. 2B are not only equally applicable for use with wire drums, bulk packs, spools and the like, but also for use with other welding-type devices and accessories, such as shielding gas tanks and storage containers for other consumables. Communication assembly 86 is preferably attached directly to wire reel 84, though it is appreciated that proper placement of communication assembly 86 in, on, or near a consumable container will vary depending upon the type of container. Communication assembly 86 includes a data storage unit 88 and a wireless communication unit 90 which, as described above, may comprise an active or passive wireless communication device, operating by RF, infrared, optical, or sonic transmission.

Communication assembly 86 may also optionally include its own battery or other power supply 100, a data input port 102, and/or a user interface 104, as described above with respect to the embodiment of FIG. 2A. When assembly 86 includes such a source of power 98, it may be enabled to operate in active or powered transmissions, such as active RFID transmissions. Thus, wireless communication unit 90 will have relatively stronger transmission strength and will be capable of relatively longer range communication as compared to passive embodiments. It is commonly known within the art that active RF communication can achieve ranges exceeding 100 meters whereas passive RF communication can achieve ranges exceeding 10 meters. GPS device 106 and DME/VOR sensors 108 provide wireless communication assembly 86 with data for encoding onto locatable transmissions.

In the embodiment shown, data storage unit 88 includes an identification number or code 92 unique to communication assembly 86, to container 84, or to the type or category of consumable contained therein. This ID number 92 is encoded in transmissions of wireless communication unit 90 to identify the source of the transmissions, and may include job or project codes, serial numbers, lot numbers, date codes, purchase order numbers, system type information, or a network ID number. Data storage unit 88 also includes data 94 indicating the type of consumable material on the reel or other container 84 to which the communication assembly 86 is connected. It is appreciated that consumable type data 94 may be as simple as a code indicating the general type of consumable of a container 84, such as a code indicating that the consumable is weld wire. Consumable type data 94 may also indicate such characteristic information as wire length, diameter, gauge, alloy type, or core type, flux characteristics, shielding gas type and pressure, various temperatures of interest, safety or MSDS information, particular welding instructions or ideal welding processes, and other similar characteristic information of welding-type consumables. This information may be used to categorize inventory counts, to match consumable containers with appropriate power sources or welding processes, to locate corresponding equipment and welding-type devices, and to warn users or disable power sources when non-compatible consumables, equipment, or other welding-type devices are combined.

Device-type sensor 110 can be used to detect which type of equipment the consumable container is connected to, and can be used to inform attached equipment of the type of consumable contained therein. Thus, consumable container 84 may provide information for use in active monitoring of the compatibility of welding-type devices. For example, when wire reel 84 is attached to a welding system (not shown), device type sensor 110 detects which type of system the reel 84 it is connected to via bar code reading, RFID communication, or by conventional wire/data connection. The device type information may be encoded in a transmission of wireless communication unit 90 and sent to a monitoring device (not shown). If the consumable type of the wire reel 84 and the particular welding system type are incompatible or at least not intended to be connected for the production process of that location, one or more monitoring devices may issue a warning signal in response, causing activation of user alert 116 or disabling of the welding system. In alternative embodiments to be discussed below, monitoring devices simply detect when incompatible consumables and systems are brought within a certain range of each other rather than waiting for a signal indicating actual connection of incompatible equipment.

Consumable sensor 112 and end of wire sensor 114 are used to provide more accurate and precise inventory monitoring. That is, a consumable container can detect via sensor 112 how much consumable is remaining therein, then continuously, periodically, or responsively update a monitoring device of such information. Sensor 112 will vary in construction in accordance with the type of consumable it is configured to detect. For example, sensor 112 could a pressure gauge to measure shielding gas, a counter to measure linear feet of weld wire leaving a reel, a level sensor to monitor the drop in the level of wire on a reel or in a drum, or the like. The end of wire sensor 114 is adapted to automatically signal that the consumable wire in a container is gone or nearly gone. Preferably, sensor 114 is attached to the terminal end of a length of wire on a reel such that when the end of the wire is pulled from the reel, the sensor 114 is automatically disconnected from communication assembly 86 or broken, signaling to the data storage unit 88 or the processing unit 98 that no consumable remains. Alternatively, a sensor having a similar function may be integrated with a pressure gauge on a shielding gas tank, to signal when pressure is low.

The consumable sensor 112 and end of wire sensor 114 also enable a facility to achieve more accurate inventory monitoring. That is, by monitoring the number of consumable containers 84 within a facility and the amount of consumable 112 within each container, monitoring devices of the facility can determine exactly how much consumable material is on hand and where the consumable materials are located. Alternatively, monitoring devices could simply transmit consumable amount data 112 or usage statistics to a central inventory controller of the facility. The consumable type data 112 from communication assembly 86 can also be used to categorize the total amounts of each consumable within a facility by consumable type. For example, a facility could determine exactly how much wire of a specific diameter is on hand. Thus, when a consumable container 84 is emptied, the end of wire signal generated by the end of wire sensor 114 could be routed as a re-supply request directly to a re-supply station (not shown) for active on-site inventory management. In addition, when the total inventory of a certain type of consumable reaches a specified or threshold amount, a reorder request could be generated for acquiring additional consumable materials for the facility. Threshold re-supply amounts may be based on user preselected or predetermined values, past re-supply levels, recent and historical rates of usage of each type of consumable, or estimated requirements for an ongoing production process.

Figure 3:
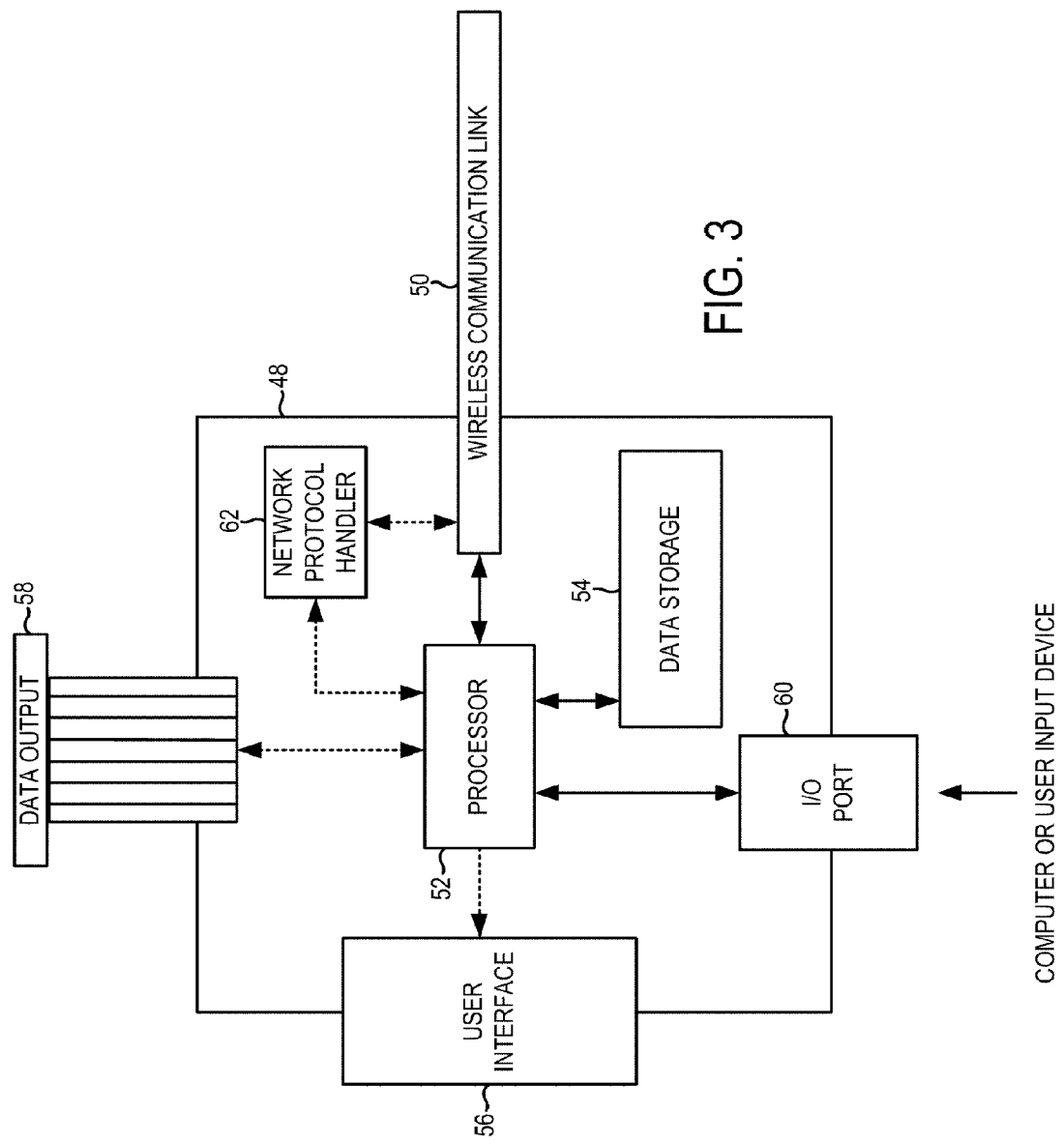
FIG. 3 is a schematic view of a monitoring device in accordance with the present invention.

Referring now to FIG. 3, a schematic view of one embodiment of a monitoring device is shown. It is contemplated that monitoring device 48 may be constructed as a handheld device, a portable device akin to a laptop computer, or a desktop or permanent station. Understandably, however, other suitable configurations could exist, such as user-adapted or user-specific configurations. Depending upon the desired features of a wireless system according to the present invention, portability of the monitoring device 48 will be beneficial. For example, if welding-type devices are to be located by directional antenna or honing, it may be more beneficial to use a monitoring device 48 configured as a handheld device. However, if monitoring device 48 is to be used to detect arrivals and departures of welding-type devices from a job site, it may be more beneficial for monitoring device 48 to be configured as a station. Regardless, it is recognized that monitoring devices 48 incorporating any of these configurations will still be inter-compatible since all configurations are capable of operating in any of the herein described network protocols.

As with the wireless communication assembly 24 discussed above, monitoring device 48 may operate on a number of different modes of wireless communication. As such, wireless communication link 50 may be configured for RF (including frequencies and protocols commonly associated with RFID or the distinctive RuBee protocols), infrared, optical, sub-sonic, or ultra-sonic communication. In a preferred embodiment, wireless communication link 50 includes a directional RF antenna, exhibiting a special gain in a specified radial direction from the monitoring device 48. In such a manner, wireless communication link 50 receives signals sent from any direction while able to detect the direction from which a given signal is being transmitted. In another embodiment, wireless communication link 50 includes both a directional antenna and an omni-directional antenna, to maximize directional gain while maintaining adequate omni-directional receiving capabilities.

Monitoring device 48 transmits signals to the wireless communication assemblies 24 of welding-type devices. The communications which are transmitted by monitoring device 48 to a welding type device may instruct welding-type devices to relay a message to other welding-type devices, request welding-type devices to respond with location information, status information, or operation information, or may instruct welding-type devices to log a preventive maintenance schedule, update system functions and software, or store operator notes. However, there are also circumstances in which a monitoring device 48 transmits messages to other monitoring devices 48. For example, monitoring devices 48 will communicate with one another when a welding-type device is being located through triangulation and when a mesh network is employed.

Likewise, monitoring device 48 will receive signals from welding-type devices, but may also receive signals from other monitoring devices 48. In operation, wireless communication link 50 receives signals from welding-type devices or other monitoring devices 48, and communicates them to processor 52. Processor 52 then decodes and recognizes the received signals and acts accordingly. In most situations upon receiving a signal from a welding-type device, processor 52 will instruct wireless communication link 50 to relay a received signal to another monitoring device 48 (as in a mesh network system) or will process the decoded data and instruct data storage 54 to store it.

However, wireless communication link 50 is not the only means of data input or output available to monitoring device 48. Specifically, data output port 58 and I/O port 60 also provide monitoring device 48 with the capability to communicate with other devices. Data output port 58 is preferably configured to log information from monitoring device 48 to a wireless communication assembly 24. For example, monitoring device 48 may be used to log operator notes, maintenance schedules, or usage history, or to update device functions on a welding-type device via data output port 58. I/O port 60, on the other hand, is configured for bi-directional communication and may be a serial port, parallel port, USB port, or any other suitable type of data communication port for transferring information between monitoring device 48 and a PC or user input device. That is, I/O port 60 may be configured to connect peripheral devices to monitoring device 48, or may be used for transferring data from monitoring device 48 to a PC or base station. Monitoring device 48 may also be equipped with its own user interface 56, such as an LCD display, to show menus and other graphical or textual messages to a user, or to display a map or directional indicator for locating welding-type devices.

If a centralized network is employed, one or more monitoring devices 48 may function as a centralized hub or server (distributed or individual) of the network, as in a "star" topology. Therefore, monitoring device 48 is optionally provided with network protocol hander 62. That is, if all messages and signals from welding-type devices are to be transmitted only to a monitoring device 48, a network handler 62 is integrated into monitoring device 48 to route and organize network data traffic. One of ordinary skill in the art will recognize that the proper type of network handler 62 to be used will depend upon desired network characteristics such as the number of nodes, whether common data storage access is to be used, and whether multiple network hubs are employed. Additionally, if a "tree" network is desired, one or more monitoring devices 48 or welding-type devices may operate as central nodes or hubs. In certain circumstances, it may be beneficial to select welding-type devices having greater power capabilities to operate as "branch" hubs, and one or more monitoring devices 48 to operate as centralized primary hub. In such a manner, devices having lower power capabilities need only transmit messages as far as a local branch hub to conserve power. The branch hub could, in turn, repeat or re-transmit the message to a more distant primary node. Likewise, repeater units or signal boosters could be employed to further aid in long distance transmission from devices having limited power capabilities. However, a network incorporating the present invention can minimally include a single monitoring device 48 and a single wirelessly communicating welding-type device.

Figure 4:
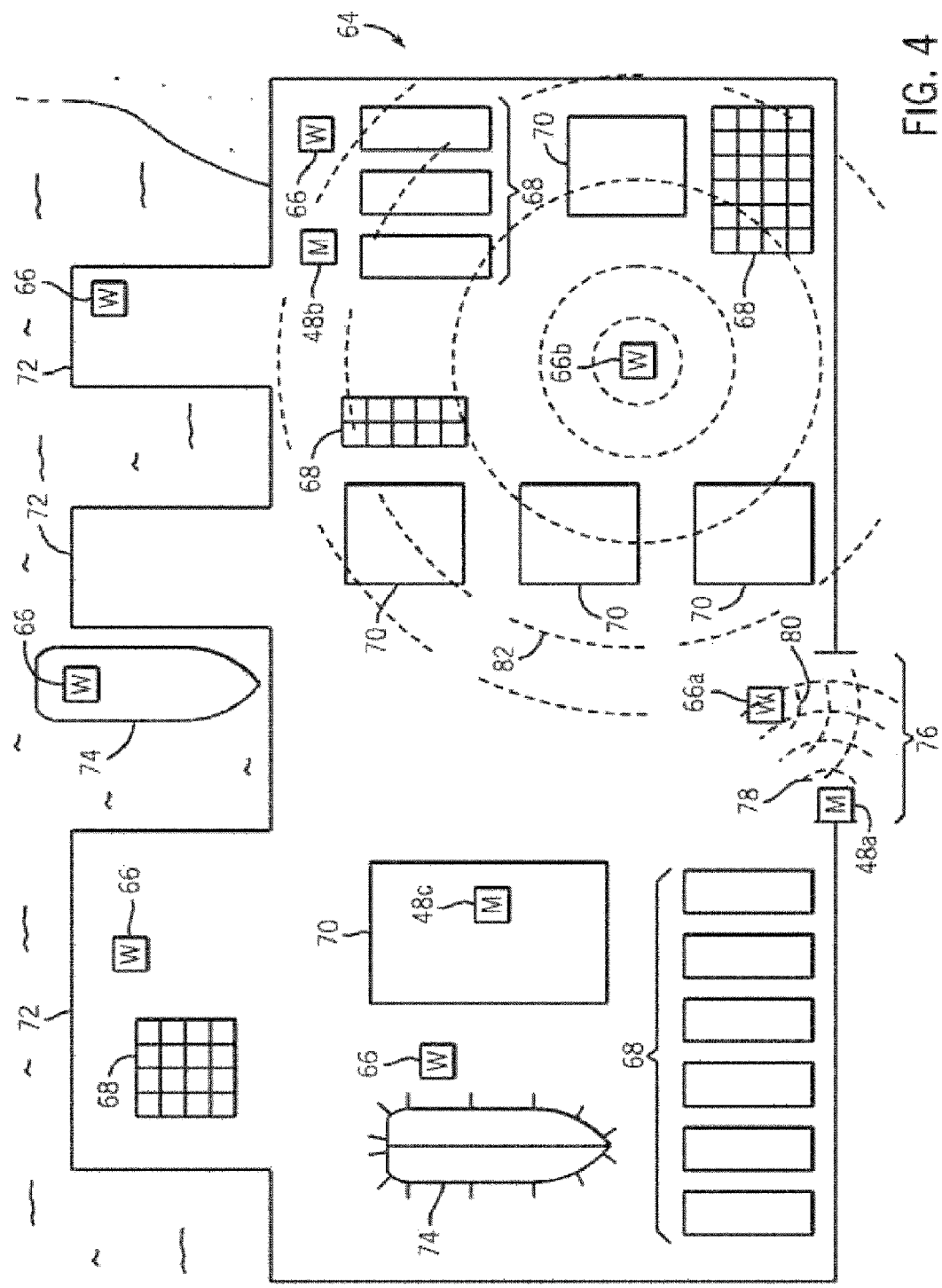
FIG. 4 is a schematic view of welding-type devices and monitoring devices in accordance with an aspect of the present invention.

Referring now to FIGS. 4-7, several features and functions of the present invention are shown. In particular, FIG. 4 depicts a welding communication system in accordance with the present invention in use at a shipyard 64. Shipyard 64 contains a multitude of shipping crates 68, buildings 70, docks or piers 72, ships 74 being constructed, monitoring devices 48, and welding-type devices 66. Monitoring device 48a, welding-type device 66a, and gate area 76 illustrate one theft prevention feature of the present invention. Monitoring device 48a emits a constant identification request signal 78, which must extend over only a short range, as shown. Thus, when a welding-type device 66a reaches gate area 76, welding-type device 66a receives the identification request signal 78 from monitoring device 48a and responds with a signal 80 containing the unique identification number of welding-type device 66a. Welding-type device 66a may be in either a fully operating or low-power "sleep" state and will still receive the identification request signal 78 and respond. Monitoring device 48a then alerts a user that a welding-type device 66a is leaving the premises. However, it is also understood that monitoring device 48a could act passively and merely detect signals initiated by welding-type device 66a. Alternatively, a welding-type device, such as 66b, may emit a periodic beacon signal 82 which extends over a wide range of a job site 64. Monitoring devices 48b and 48c are evenly positioned over shipyard 64, such that any welding-type device 66 located therein will be within range of at least one monitoring device 48. As such, when no monitoring devices 48, detect a beacon signal from a particular welding-type device 66b, a user may be alerted that the particular welding-type device 66b is missing, has stopped functioning, or otherwise requires attention. In either of these embodiments, theft prevention may be achieved by storing a schedule of authorized departures in data storage 54 of one or more monitoring devices 48. Thus, if an unauthorized departure occurs, security or loss-prevention personnel may be alerted.

Figure 5:
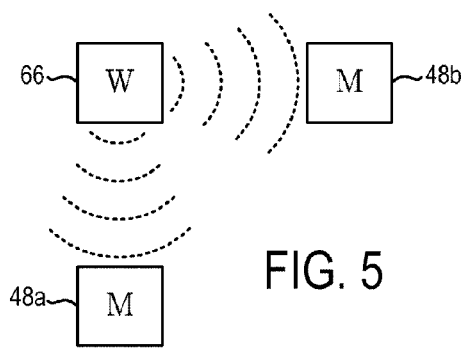
FIG. 5 is a schematic view of a welding-type device and monitoring devices in accordance with another aspect of the present invention.

FIG. 5 illustrates how a welding-type device 66 may be located by one or more monitoring devices 48. First, welding-type device 66 may transmit an omni-directional beacon signal, which is detected by a monitoring device 48a. Monitoring device 48a could then hone in on the position of welding-type device 66 through the use of a directional antenna. Alternatively, if the beacon signal were to reach more than one monitoring device 48a, 48b equipped with a directional antenna, the monitoring devices 48a, 48b could locate the position of welding-type device 66 through triangulation. Furthermore, in embodiments in which the wireless communication device 24 of a welding-type device 66 is equipped with integrated location sensors 42-44, such as a GPS device 42, an inertial sensor 43, or DME/VOR equipment 44, either or both of monitoring devices 48a, 48b could transmit a location request signal and receive location information from the welding-type device 66 in a location response signal.

Figure 6:
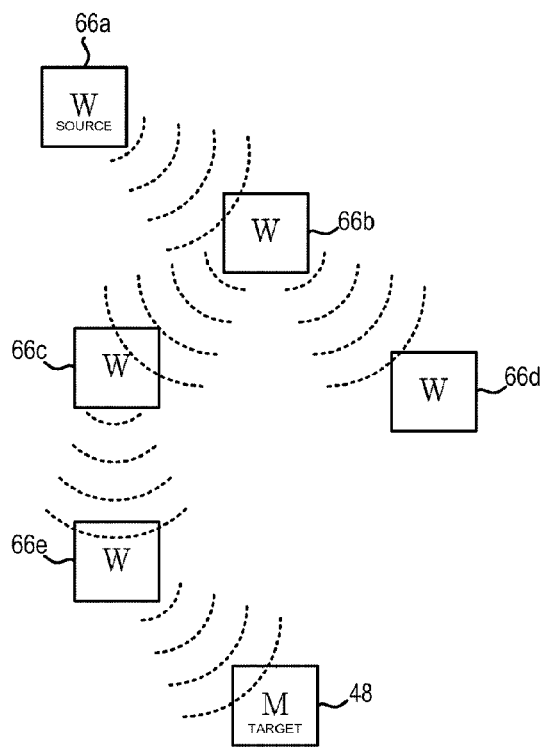
FIG. 6 is a schematic view of welding-type devices and a monitoring device in accordance with yet another aspect of the present invention.

Referring now to FIG. 6, an example of a communication path of a mesh network is shown. As depicted, welding-type device 66a originates a message signal intended for monitoring device 48, the signal containing both the unique identification number (either a serial number, device number, or the like or a network address similar to an IP address) of monitoring device 48 and message data. The data portion of a message may contain communication protocol commands or identifiers, information stored on a data storage unit (not shown) of the device 66a, or information received from sensors (not shown) of the device 66a. However, welding-type device 66a transmits a message signal without enough range to reach monitoring device 48, the intended recipient. Therefore, welding-type device 66b receives the message and relays it to other welding-type devices 66c, 66d in the vicinity. Welding-type device 66c then relays the message to welding-type device 66e, which is within the transmission range of welding-type device 66c. Welding-type device 66e, in transmission range of monitoring device 48, then relays the message to its intended recipient. In an alternative embodiment, wireless communication assembly 24 of welding-type device 66a could compute the most efficient or shortest transmission path to its intended recipient, monitoring device 48, and formatted its message signal to be relayed accordingly. Thus, welding-type device 66d would not have received or would not have read the message signal.

Figure 7:
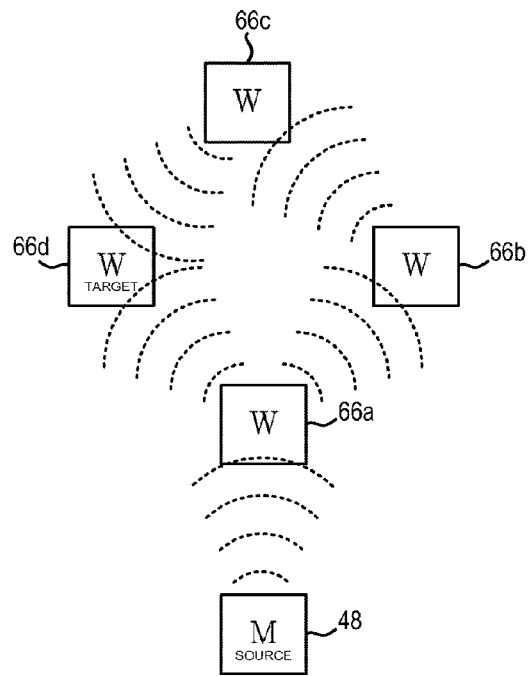
FIG. 7 is a schematic view of welding-type devices and a monitoring device in accordance with a further aspect of the present invention.

FIG. 7 shows an example of mesh network communication in the opposite direction. Monitoring device 48 is not in transmission range of its intended message recipient, welding-type device 66d. Thus, monitoring device 48 transmits a message signal containing the unique identification number of welding-type device 66d, and message data, to the welding-type device 66a within transmission range. In one embodiment, welding-type device 66a then relays the signal to any other welding-type devices 66b, 66d within transmission range. The transmitted message signal reaches both welding-type device 66d and welding-type device 66b. However, welding-type device 66b is not in range of welding-type device 66d and continues to relay the message through welding-type device 66c to reach welding-type device 66d. One of ordinary skill in the art will recognize that this method may be more desirable for systems having a small number of nodes, nodes using inexpensive, non-complex wireless communication assemblies, or nodes positioned in a known or predetermined arrangement. In an alternate embodiment, wireless communication assembly 24 of welding-type device 66a determines the shortest transmission path to the target welding-type device 66d and transmits a signal to travel accordingly. That is, processing unit 52 of monitoring device 48 utilizes a series of algorithms to determine the shortest and most efficient transmission path to an intended recipient and transmits a message containing the unique identification numbers of the welding-type devices 66 in the communication chain, thereby reducing overall network traffic.

Referring now to FIG. 8, another embodiment of the present invention is shown in which a number of welding-type devices 120 are stored on a shipping or storage container ("SC") 118, such as a pallet or crate. Preferably, welding-type devices 120 are containers or packages of welding consumables, such as wire reels or shielding gas containers. Each welding-type device 120 has a low power or short-range transmitter attached thereto, such as a passive RFID tag (not shown). Shipping container 118 is equipped with a higher power or long-range transmitter, such as an active RFID tag (not shown). In accordance with the transmission protocols and topographies described above, a welding-type device 122 generates a wireless message which is received by the shipping container 118. The shipping container 118 then repeats the signal or transmits a signal having the same or similar data to a distant monitoring device 124. Thus, the number of more expensive, higher power consuming, long-range transmitters is reduced, yet messages from each welding-type device 120 are still able to reach distant recipients 124. In an alternative embodiment, shipping container 118 may be equipped with a signal booster or repeater unit which is not a node of a network topography, but merely repeats received signals at a higher transmission strength.

Figure 9:
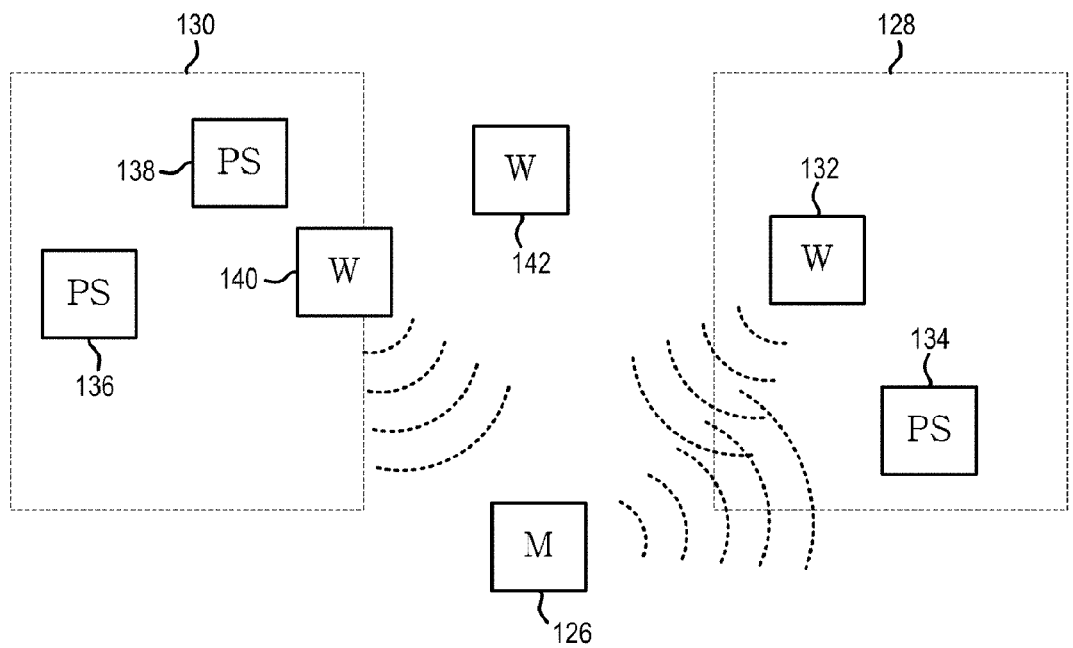
FIG. 9 is a schematic view of welding-type devices and a monitoring device in accordance with still another alternative of the present invention.

FIG. 9 depicts an alternative embodiment of the present invention in which operators may monitor the use of consumables, accessories, and welding-type equipment to ensure that only compatible or interoperable consumables are matched with compatible equipment, etc. A monitoring device 126 (or a plurality of such devices) is positioned within a facility to detect signals of welding-type devices including power sources 134, 136, 138 and related equipment as well as signals of consumable wire containers 132, 140, 142 and other consumable containers. The signals from these devices include both location information and characteristic or type information. Therefore, the monitoring device can detect both the type and location of each welding-type device 132-142 within the facility, as well as receive data therefrom as discussed above.

In the embodiment depicted, a manufacturing facility or other industrial environment has two welding zones 128, 130 which are designated locales of the facility within which predetermined welding-type processes are to be carried out. A memory device of monitor 126 has an electronic list of welding-type processes carried out within the facility and the zones 128, 130 in which they are to be carried out. In connection with this list are databases for each process showing which welding-type devices are compatible therewith. By monitoring the position of devices 132-142 within the facility and comparing such positions with the known boundaries of zones 128, 130 stored in memory, monitor 126 can determine in which zone a device 132-142 is located. For example, monitoring device 126 will have determined that power sources 136, 138 are in zone 130 and that wire reel 132 and power source 134 are in zone 128. When a device enters a zone in which a welding process is being carried out that uses or requires the device, the monitor takes no action. Wire reel 140 is shown entering zone 130 which is designated for a MIG process that requires wire reels of the diameter and type of wire reel 140. In contrast, when a device enters a zone of a welding process to which the device is not compatible or required, monitor 126 generates an incompatibility signal. An incompatibility signal is preferably a signal that activates a user alert, warning indicator, or other incompatibility indicator of the device which is entering the zone. However, it is contemplated that other functions of the incompatibility signal may also be used, such as disabling power sources or other devices in the zone or activating warning indicators located on power sources or in the zone itself. For example flux-cored wire reel 132 has been brought into zone 128 in which a welding process is on-going that does not require flux-cored wire. Therefore, monitor 126 is shown generating an incompatibility signal directed to power source 134 to disable the power source 143. Alternatively, monitor 126 can issue or cause to be issued other warning signals such as cell phone calls, text messages, PDA alerts, email alerts, or other notifications for supervisory personnel.

In an alternative aspect of the invention, rather than comparing the positions of welding type devices 132-142 to known boundaries of zones 128, 130, monitor 126 could be configured to compare the locations of devices 132-142 relative to each other. In this regard, the memory unit of monitor 126 contains a database of the types of consumables, equipment, and other devices that are compatible with any given welding-type device by category and characteristics. Therefore, when a device is brought within a set distance of another device, for example 1 foot, monitor 126 will perform an interoperability determination. That is, monitor 126 will compare one of the devices with the list of known compatible devices of the other device. For example, wire reel 140 is brought within a specified distance of power source 138 and monitor 126 determines that reel 140 and power source 138 are interoperable or compatible device types, so no incompatibility signal is generated. In contrast, flux-cored wire reel 132 is shown being brought within a certain distance of power source 134 which is not operable with flux-cored wire. Therefore, monitor 126 generates an incompatibility signal to activate a warning or disable the power source 134.

Accordingly, it has been shown that the present invention provides a flexible and adaptable wireless communication system for welding-type devices. The present invention is particularly useful in locating, monitoring, and maintaining an inventory of power sources, equipment, consumables, and other welding-type devices, in preventing theft and misplacement of devices, and in organizing maintenance and resource distribution. Further, the present invention provides facilities with the capability to monitor for the correct usage of compatible welding-type devices, and alter users or disable devices when users attempt to connect or combine equipment, consumables, or other welding-type devices incompatible with one another or with a welding-type process of the location.

Thus, the present invention includes a welding-type consumable inventory system having at least one wireless monitoring device and at least one welding-type consumable container. The consumable container has a consumable amount sensor and a wireless transmitter that emits wireless signals with type and amount data for the consumable encoded thereon. The wireless monitoring device is constructed and/or positioned such that it can find the welding-type consumable container by receiving wireless signals therefrom.

The present invention also encompasses a method for implementing a consumable inventory system. The method includes configuring a number of welding-type consumable containers to emit locatable data signals and arranging a wireless detection network in a facility to receive the locatable data signals. A computer readable storage medium is associated with a processing unit of the wireless detection network and a computer program is then stored on the medium. The computer program, when executed by the processing unit, causes the processing unit to determine a remaining amount of welding-type consumables within the facility and automatically generate a re-supply order when the remaining amount of welding-type consumables reaches a threshold level.

Further included in the present invention is a welding-type consumable inventory unit having a shipment unit and a plurality of welding-type consumable containers stored therewith. The shipment unit has a transceiver attached thereto and the welding-type consumable containers have low power transmitters which emit signals indicating consumable type data. The transceiver of the shipment unit is positioned so that it can receive the signals from the low power transmitters and then emit a locatable signal of relatively higher transmission strength representing the consumable type data from the consumable containers' signals.

In addition, the present invention contemplates a consumable monitoring network having at least one wireless transceiver and a memory unit connected to communicate therewith. The at least one wireless transceiver has a processing unit that is positioned within a facility such that it can receive wireless signals from welding-type devices in the facility. Upon receiving the wireless signals, the at least one wireless transceiver processes locations and characteristic data therefrom for the welding-type devices. The at least one wireless transceiver is configured so that it can compare the location and characteristic data with compatibility data stored on the memory unit, and potentially generate an incompatibility signal.

The present invention has been described in terms of the preferred embodiment, and it is recognized that equivalents, alternatives, and modifications, aside from those expressly stated, are possible and within the scope of the appending claims.

What is claimed is:

1. A method for implementing a consumable inventory system comprising:
   configuring a number of welding-type consumable containers to emit locatable data signals;
   emitting locatable data signals from at least one of the welding-type consumable containers;
   arranging a wireless detection network in a facility to receive the locatable data signals;
   associating a non-transitory computer readable storage medium with a processing unit of the wireless detection network; and
   storing a computer program on the non-transitory computer readable storage medium which, when executed by the processing unit, causes the processing unit to:
      determine a remaining amount of welding-type consumables within the facility;
      automatically generate a re-supply order when the remaining amount of welding-type consumables reaches a threshold re-supply level;
      determine a location within the facility of a particular welding-type consumable container based upon a locatable data signal received therefrom;
      determine whether the particular welding-type consumable container is located within an incompatible welding process zone; and
      generate an incompatibility signal if the particular welding-type consumable container is located within an incompatible welding process zone.

2. The method of claim 1 wherein the incompatibility signal comprises at least one of a disabling command or a warning command.

3. The method of claim 1, further comprising configuring the wireless detection network to acquire at least one of triangulation data, GPS data, DME/VOR-type data, and LORAN-type data and transmit the data to the processing unit for location determination.

4. The method of claim 1 wherein the computer program further causes the processing unit to determine the threshold re-supply level by at least one of user settings, past re-supply levels, usage statistics, and estimated production requirements.

5. The method of claim 1 wherein the step of configuring the number of welding-type consumable containers further comprises attaching a long range wireless device to a shipment container and short range wireless devices to each of a plurality of individual units of the shipment container.

6. A welding-type consumable inventory unit comprising:
   a shipment unit having a transceiver attached thereto;
   a plurality of welding-type consumable containers stored with the shipment unit, each of the plurality of welding-type consumable containers having a low power transmitter which is constructed to emit a signal indicating consumable type data; and
   wherein the transceiver is positioned to receive signals of the low power transmitters and emit a locatable signal of relatively higher transmission strength representing the consumable type data of the plurality of welding-type consumable containers, the transceiver is configured to determine interoperability of the plurality of welding-type consumable containers with a welding-type device within a selected distance of the shipment unit, and the transceiver is configured to generate an incompatibility signal when the plurality of welding-type consumable containers and the welding-type device are not interoperable.

7. The welding-type consumable inventory unit of claim 6 wherein the locatable signal includes at least one of a beacon signal, GPS data, a DME/VOR-type signal, and a LORAN-type signal.

8. The welding-type consumable inventory unit of claim 6 further comprising remaining consumable sensors attached to each of the plurality of welding-type consumable containers and connected to provide remaining consumable data for the low power transmitters of the welding-type consumable containers.

9. The welding-type consumable container of claim 6 wherein at least one of the shipment unit and the plurality of welding-type consumable containers include incompatible welding process indicators, activatible by the incompatibility signal.

10. A consumable monitoring network comprising:
    at least one wireless transceiver having a processing unit and positioned within a facility to receive wireless signals of welding-type devices in the facility and process location and characteristic data therefrom;
    a memory unit having welding-type compatibility data stored thereon and connected to communicate with the at least one wireless transceiver; and
    wherein the at least one wireless transceiver is configured to generate an incompatibility signal by comparing location and characteristic data of at least one welding-type device with compatibility data stored on the memory unit, wherein the welding-type compatibility data comprises one of interoperability data for a number of welding-type device categories or data indicating welding-type processes designated for a number of locales of the facility and welding-type device categories compatible with each welding-type process, and the wireless transceiver is configured to determine welding-type process compatibility of a welding-type device within a locale of the facility and generate the incompatibility signal when the welding-type device is not compatible with the welding-type process of the locale.

11. The network of claim 10 wherein the wireless signals of the welding-type devices comprise at least one of beacon signals, encoded GPS data, DME/VOR-style signals, and LORAN-style signals.

12. The network of claim 10 wherein the characteristic data includes at least one of device category, type, style, serial number, ownership, capabilities, remaining resources, and devices connected thereto.

13. The network of claim 10, wherein the wireless transceiver is further configured to determine interoperability of two or more welding-type devices within a selected distance of one another and generate the incompatibility signal when the two or more welding-type devices are not interoperable.

14. The network of claim 10 wherein the incompatibility signal is encoded to disable a welding-type device or cause a warning indicator of the welding-type device to become active upon receipt by the welding-type device.

15. The network of claim 10 wherein the at least one wireless transceiver is configured to automatically generate a re-supply request when remaining resource data from the wireless signals of the welding-type devices indicates that total inventory of a given category is below a threshold level.

16. The network of claim 10 further comprising at least one intermediate transceiver positioned to receive the wireless signals of the welding-type devices and retransmit data thereof to at least one monitoring device.

\* \* \* \* \*